United States Patent [19]

Lachner et al.

[11] 4,278,005
[45] Jul. 14, 1981

[54] CONNECTING BOLT AND COUPLING ELEMENT

[75] Inventors: Hans Lachner, Herne; Werner Boer, Castrop-Rauxel, both of Fed. Rep. of Germany

[73] Assignee: Klockner-Werke Aktiengesellschaft, Duisburg, Fed. Rep. of Germany

[21] Appl. No.: 40,303

[22] Filed: May 18, 1979

[30] Foreign Application Priority Data

Jun. 6, 1978 [DE] Fed. Rep. of Germany ....... 2825300

[51] Int. Cl.³ .................. F16B 19/00; F16B 21/00
[52] U.S. Cl. .................... 411/337; 411/417; 411/437; 411/511
[58] Field of Search ............ 85/7, 5 R, 1 C, 32 V, 85/33, 1 T, 21, 37; 151/41.73

[56] References Cited
U.S. PATENT DOCUMENTS

| | | | |
|---|---|---|---|
| 1,652,169 | 12/1927 | Fleming | 85/1 L |
| 2,828,662 | 4/1978 | Antel | 85/32 V |
| 3,494,592 | 2/1970 | Meschorat et al. | |
| 3,915,053 | 10/1975 | Ruhl | 85/7 |

Primary Examiner—Robert L. Wolfe

[57] ABSTRACT

Disclosed is a device comprising a connecting bolt having a gripping profile near one end and a coupling element having a profile adapted to engage the profile of the connecting bolt. The profile of the connecting bolt is a plurality of projecting teeth separated by grooves where the spacing between at least some of the teeth and the depth of at least some of the grooves increases toward the end of the connecting bolt. The profile of the coupling element is a plurality of teeth separated by grooves which generally correspond to the profile of the teeth of the connecting bolt. However, the spacing between at least some of the grooves relative to the teeth on the connecting bolt is slightly greater and becomes increasingly greater from the groove adapted to engage the tooth of the connecting bolt nearest the end of the bolt to the groove adapted to engage the tooth of the connecting bolt furthest from the end of the bolt.

6 Claims, 6 Drawing Figures

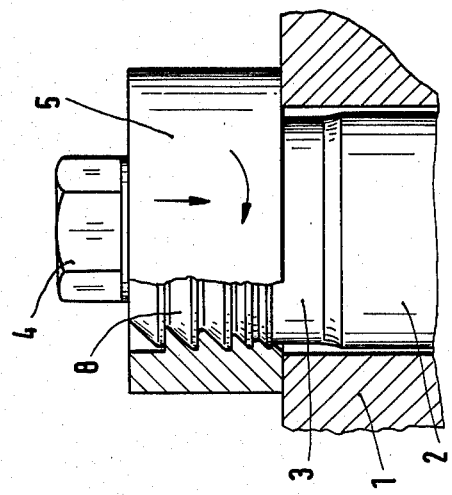
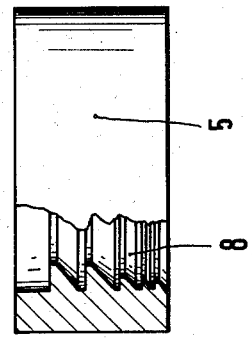
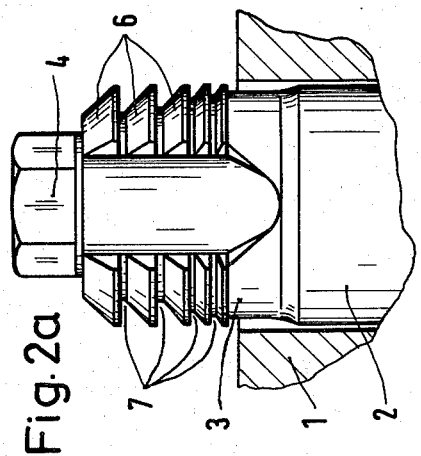
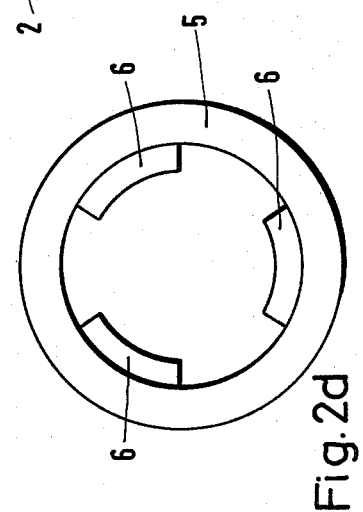
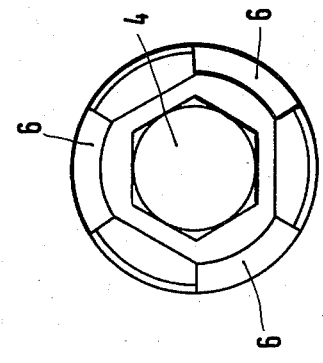

CONNECTING BOLT AND COUPLING ELEMENT

BACKGROUND OF THE INVENTION

The present invention relates generally to a device construction used for tightening connecting bolts and, more particularly, to a device construction which is supported on the portion that is to be attached by the bolt and wherein the upper end of the connecting bolt of the device is provided with a gripping profile which corresponds to the profile of a coupling element such as a couple casing or coupling jaws also forming a portion of the device.

Connecting bolts are used for the attachment of lids onto pressure vessels such as, for example, reactor vessels, heat exchangers and steam generators as well as in jet engines. From German Pat. No. 1,300,467, it is known to provide the ends of such connecting bolts with a profile and the coupling jaws which are used to grip the ends of these connecting bolts have a corresponding profile so as to be able to seize and prestress the connecting bolts. The profile on the bolts is made by cutting uniform grooves with trapezoidal cross-sections into the neck of the connecting bolts as is done with anti-fatigue screws, and corresponding projections are provided on the coupling jaws which are adapted to engage with the grooves on the bolt.

However, the above construction for coupling bolts has the disadvantage that the profiled neck of the bolt and thus also the overall height of the coupling jaws must be relatively large since the stress distribution in the profiles of the neck and coupling jaws is unfavorable.

SUMMARY OF THE INVENTION

An object of the present invention is therefore to provide a favorable ratio of core diameter to outside diameter in the neck of the connecting bolt and having a maximum constant depth in the profile so as to thereby create a favorable stress distribution in the connection between the connecting bolt and a coupling element.

This object is achieved according to the present invention by providing a gripping profile on the neck of a connecting bolt in which, starting from the lower most profile tooth and from the core diameter of the neck, the depth and spacing of the profile increases toward the end of the connecting bolt. In addition, the spacing of the profile of the coupling element is developed in corresponding manner, but is corrected such that the distances from the topmost to the lower profile threads, which are related to the corresponding distances of the profile teeth of the connecting bolt, becomes increasingly greater.

According to a particularly preferred embodiment, the connecting bolt has ten profile teeth, the upper five profile teeth having a constant spacing and the lower five profile teeth having a graduated decreasing spacing. At the same time, the depth of the upper five grooves of the profile is also constant while the depth of the lower five grooves of the profile is graduated in decreasing depth. In a like manner, the grooves of the profile of the coupling element have a spacing which corresponds to the profile on the neck of the bolt.

In another preferred embodiment, the connection between the bolt and coupling element is provided by using an undivided coupling element having a bayonet type coupling. At the same time, a particularly favorable embodiment will be achieved whenever the gradation of the profile depth is selected such that it corresponds to the number of the series 2; 4; 7.25; 12.35 and 21.4% of the outside diameter, the neck being considered as the first groove of the profile.

The present invention provides the advantage, among others, that a more favorable ratio of core diameter to outside diameter of the neck of the bolt, possibly also in the case of a constant maximum profile depth, is created, as well as that the strain distribution in the connection is more favorable. As a result, the overall height of the connection between the bolt and the coupling element will be reduced. The correction of the spacing of the coupling element moreover compensates for the elastomeric deformations of the parts of the coupling element under an operational load and ensures the distribution of load required for a uniform tightening. That is, the greatest load is placed on the upper particularly strong teeth and the least load is on the lower, weaker teeth of the profile. In contrast, in a profile having no correction as described above, the load distribution would be exactly the reverse. Therefore, the lowermost teeth, in this construction the weakest teeth, would then have to absorb the greatest load.

In the present invention, the correction values for the spacings can be calculated easily and the corrected profile may be produced with normal production processes. The correction values may be up to 30 times greater than the production tolerances for profile spacing used in the case of known profilings so that adherence to the required precision will cause no difficulties in manufacture.

The invention will be described in more detail with reference to two embodiments illustrated in the drawings which are given by way of example. In one drawing, particular measurements appropriate for one embodiment of the invention are given by way of example since, in the case of the present invention, the ratios of the dimensions are an important factor and because the technical nature of the invention can also be explained more easily on the basis of such an embodiment.

DESCRIPTION OF THE DRAWING

In the drawing:

FIGS. 2a-2e show an embodiment of a connecting bolt in accordance with the present invention for use with a closed couple casing;

FIG. 2a being a view of the connecting bolt with support for the closed couple casing, FIG. 2b being a top view of the connecting bolt, FIG. 2c being a cross section through the couple casing, FIG. 2d being a top view of the couple casing, and FIG. 2e being a cross-section through the connection between the connecting bolt and the couple casing when mounted together.

DETAILED DESCRIPTION OF THE PREFERRED EMBODIMENTS

Figure 1:
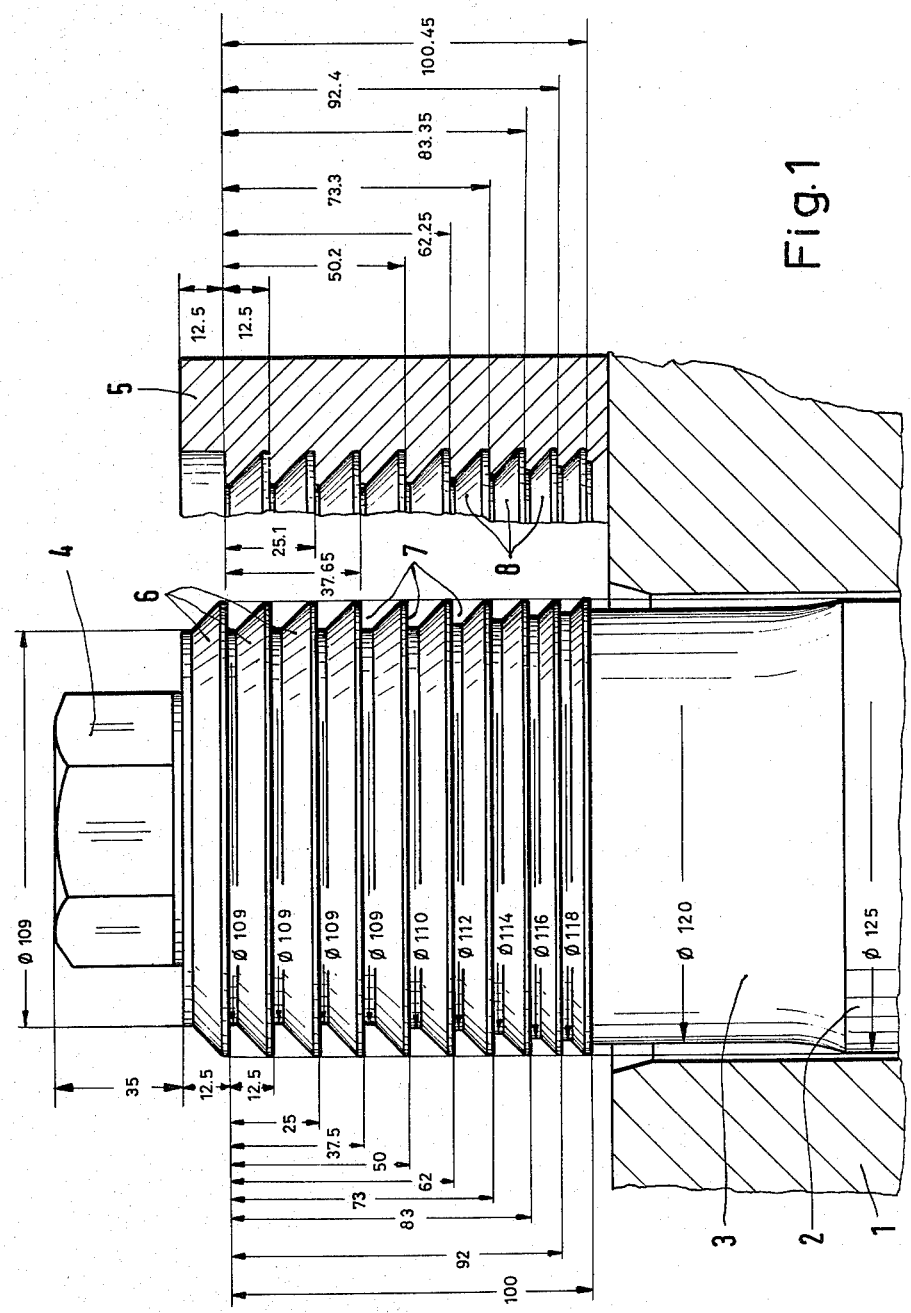
FIG. 1 shows a cross-section of a connecting bolt construction for use with divided coupling jaws.

In FIG. 1, shown is support 1 and connecting bolt 2 having neck 3 and hexagonal head 4 which allows a wrench to be used for turning the bolt. One half of two coupling jaws 5, which may be moved together or apart, for example, with a cylinder, is illustrated on one side of connecting bolt 2. As is clearly apparent from the profile of neck 3, the thickness of projecting teeth 6 and depth of the grooves 7 between the teeth increases from the bottom of the neck toward the top. The depth of grooves 7 reaches a maximum dimension at the top of neck 3. Grooves 8 of the profile of coupling jaw 5 forming projecting teeth correspond to the profile of teeth 6 and grooves 7 on neck 3. In the various dimensions given by way of example in FIG. 1, the diameter of the shaft of bolt 2 is about 125 mm and the diameter of neck 3 is about 120 mm.

As is apparent from a detailed consideration of the measurements provided in FIG. 1, the spacing between grooves 8 on coupling jaw 5 relative to the spacing between projecting portions of teeth 7 on bolt 2 is corrected in accordance with the present invention. Specifically, it is to be noted, for example, the spacing of the fourth tooth 7 of bolt 2 is 37.5 mm from the reference line while the spacing of the fourth groove 8 on coupling jaw 5 is corrected to be 37.65 mm from the reference line i.e., a slightly greater dimension. Similar corrections can be noted from the succeeding spacings between grooves 8 on jaw 5, the corrections becoming increasingly greater the further the particular groove is from the end of bolt 2. Thus, the correction on the coupling element is that the spacing between at least some of the grooves on the element relative to the teeth on the connecting bolt is slightly greater and becomes increasingly greater from the groove adapted to engage the tooth of the connecting bolt nearest the end of the bolt to the groove adapted to engage the tooth of the bolt furthest from the end of the bolt.

The same reference numerals used in FIG. 1 have been also utilized in the illustrated embodiment of FIG. 2. The embodiment shown differs only from the embodiment illustrated in FIG. 1 in that a closed couple casing 5 is used instead of the separate coupling jaws. In order to engage closed casing couple 5 with the profile of connecting bolt 2, both the bolt as well as the closed casing are not profiled on their entire periphery, but only on three segment sections about their periphery as is shown in FIG. 2b with regard to the bolt and in FIG. 2d with regard to the casing. These segment sections which represent teeth 6 include an angle of about 60° C. The gaps between these segment sections are then continuously unprofiled both in bolt 2 as well as on casing 5.

Whenever closed couple casing 5 is to be placed onto bolt 2 in order to establish the tightening connection, the casing must first be rotated about its periphery such that teeth 6 of the casing will fit into gaps between teeth 6 on the connecting bolt. Casing 5 will then be lowered over bolt 2 up to support 1 and thereafter rotated about 60° so that the segmentlike teeth 6 of the bolt and of the casing intermesh so as to allow any forces to then be transferred. The two arrows in FIG. 2e illustrate the motions by which casing 5 and bolt 2 are engaged which in principle corresponds with a so-called bayonet type coupling. The axial arrow indicates the direction in which casing 5 is lowered onto neck 3 of bolt 5 and the arcuate arrow indicates the direction of rotation of the casing relative to the neck. Grooves 8 of coupling case 5 are shown in the FIGS. 2c and 2e.

While the present invention has been described with reference to particular embodiments thereof, it will be understood that numerous modifications may be made by those skilled in the art without actually departing from the spirit and scope of the invention as defined in the appended claims.

We claim:

1. An elongated connecting device which comprises an elongated connecting bolt and a coupling element,
    said elongated connecting bolt including a head and a neck, said neck including a gripping portion comprising a plurality of radially-projecting teeth separated by grooves, the spacing between at least some of the teeth and the depth of at least some of the grooves increasing along said gripping portion in a direction towards said head,
    said coupling element including a gripping portion comprising teeth separated by grooves, said teeth and said grooves being dimensioned to correspond generally with said teeth and said grooves of said gripping portion of said neck of said connecting bolt so as to form a gripping portion of said coupling element profiled similarly to said gripping portion of said connecting bolt, the spacing between at least some of the grooves relative to the teeth of said gripping portion of said coupling element being slightly greater and becoming increasingly greater from the groove adapted to engage the tooth of the gripping portion of said connecting bolt nearest the head to the groove adapted to engage the tooth of the gripping portion of said connecting bolt furthest from said head.

2. The connecting device of claim 1 wherein said coupling element includes a hollow interior and wherein said gripping portion thereof is located on the interior of said hollow portion.

3. The connecting device of claim 2 wherein said gripping portion comprises at least two separated segments of the interior of said hollow portion.

4. The connecting device of claim 3 wherein said gripping portion comprises three separated segments of the interior of said hollow portion.

5. The connecting device of claim 1 wherein said coupling element comprises at least two coupling jaws.

6. The connecting device of claim 1 wherein said gripping portion of said connecting bolt comprises at least two separated segments on the surface of said neck.

* * * * *

UNITED STATES PATENT OFFICE
CERTIFICATE OF CORRECTION

PATENT NO. : 4,278,005

DATED : July 14, 1981

INVENTOR(S) : Hans Lachner and Werner Boer

It is certified that error appears in the above–identified patent and that said Letters Patent are hereby corrected as shown below:

[30] FOREIGN APPLICATION PRIORITY DATA

Jun. 9, 1978 [DE] Fed. Rep. of Germany...2825300

Signed and Sealed this

Sixth Day of October 1981

[SEAL]

*Attest:*

*Attesting Officer*

GERALD J. MOSSINGHOFF

*Commissioner of Patents and Trademarks*